United States Patent [19]
Takei

[11] Patent Number: 5,855,831
[45] Date of Patent: Jan. 5, 1999

[54] METHOD FOR FORMING A HEADREST

[75] Inventor: Yoshiyuki Takei, Akishima, Japan

[73] Assignee: Tachi-S Co., Ltd., Tokyo, Japan

[21] Appl. No.: 2,029

[22] Filed: Dec. 31, 1997

[51] Int. Cl.$^6$ .............................. B29C 44/06; B29C 44/12
[52] U.S. Cl. ...................... 264/46.6; 264/46.7; 264/276
[58] Field of Search .................................. 264/276, 46.6, 264/46.7

[56] References Cited

U.S. PATENT DOCUMENTS

| | | | |
|---|---|---|---|
| 4,891,081 | 1/1990 | Takahashi et al. | 264/46.7 |
| 4,908,170 | 3/1990 | Kurimoto | 264/46.7 |
| 5,004,572 | 4/1991 | Kurimoto | 264/46.7 |
| 5,061,419 | 10/1991 | Kouda et al. | 264/46.6 |
| 5,135,593 | 8/1992 | Quirin | 264/46.7 |
| 5,261,726 | 11/1993 | Yanagishita . | |
| 5,478,136 | 12/1995 | Takeichi et al. . | |
| 5,611,977 | 3/1997 | Takei | 264/46.7 |
| 5,681,087 | 10/1997 | Yamano et al. . | |
| 5,681,088 | 10/1997 | Takei . | |
| 5,709,828 | 1/1998 | Bemis et al. | 264/276 |
| 5,730,917 | 3/1998 | Ishikawa et al. | 264/276 |

FOREIGN PATENT DOCUMENTS

| | | |
|---|---|---|
| 6312425 | 11/1994 | Japan . |
| 7223226 | 8/1995 | Japan . |
| 911252 | 1/1997 | Japan . |
| 956939 | 3/1997 | Japan . |
| 9267679 | 10/1997 | Japan . |
| 9276074 | 10/1997 | Japan . |

*Primary Examiner*—Allan R. Kuhns
*Attorney, Agent, or Firm*—Browdy and Neimark

[57] ABSTRACT

In forming a headrest for automotive seat, a three-dimensional trim cover assembly with an opening formed therein is subjected to a foaming process. The trim cover assembly has a pair of extensions formed in that opening and a foldable sealing portion defined in one of those two extensions. The foldable sealing portion is formed with a hole. In operation, both two extensions are turned over via the opening into the trim cover assembly, and during the foaming process, an injection nozzle is inserted through the opening and into the hole of foldable sealing portion. Then, a liquid base foaming material is injected from the injection nozzle into the trim cover assembly and cured therein, during which, the foldable sealing portion is folded about another of the two extension by a pressure applied thereto from the liquid base foaming material being cured, so as to close and seal the opening against leakage of the liquid base foaming material from that particular opening.

16 Claims, 4 Drawing Sheets

METHOD FOR FORMING A HEADREST

BACKGROUND OF INVENTION

1. Field of the Invention

The present invention relates to a method for forming a headrest for use on an automotive seat, and in particular to the method based on a foaming process wherein a liquid base foaming material is injected and cured within a three-dimensional trim cover assembly to form the headrest.

2. Description of Prior Art

According to a typical known foaming process for producing a headrest, a three-dimensional trim cover assembly of a predetermined headrest shape is firstly provided by sewing together required separate cover sections, with an opening defined therein, then a generally U-shaped headrest frame having a pair of headrest stay portions is inserted through the opening into within the trim cover assembly, and thereafter, a liquid base foaming material is injected and cured in the trim cover assembly, so as to produce a foamed resultant headrest with the pair of headrest stay portions projecting therefrom.

This foaming process has encountered the problem that the liquid base foaming material is leaked through the opening to the outside of trim cover assembly, leaving an objectionable spot thereon. Conventionally, in an attempt to prevent the leakage of liquid base foaming material, typical solution is for example found in the Japanese Granted Patent Pub. No. 6-45149 and Japanese Laid-Open Patent Pub. No. 7-31759, wherein a pair of extensions are formed in the portion of trim cover assembly corresponding to that opening such as to extend inwardly from the opening into within the trim cover assembly, and a flattened tubular film piece is fitted between the pair of extensions, so that an injection nozzle can be inserted through the flattened tubular piece into the inside of trim cover assembly, and, during the foaming process, the liquid base foaming material being injected from the nozzle is prevented by those two extensions and film from the opening in question.

However, such conventional method requires cutting off an externally exposed part of the film which projects outward from the opening, subsequent to the foaming process, thus resulting in a troublesome labor on the part of worker and also in the high likelihood of a cut, tear or undesired damage being given to the trim cover assembly when the worker cuts off the film.

SUMMARY OF THE INVENTION

In view of the above-stated drawbacks, it is a primary purpose of the present invention to provide an improved method for forming a headrest under a foaming process, which can be easily effected while preventing leakage of a liquid base foaming material from the opening, and avoids use of any other separate element for preventing the leakage of liquid base foaming material.

In order to achieve such purpose, in accordance with the present invention, there is basically provided the steps of:

providing a three-dimensional trim cover assembly preformed in a predetermined headrest shape, which has an opening therein and a pair of extensions formed in the opening, wherein one of the pair of extensions includes a foldable sealing means defined therein, which is foldable about another of the pair of extensions to close and seal the opening, and a hole means defined in such one of pair of extensions;

providing a foaming die means which includes an injection nozzle means for injecting a liquid foaming material into within the trim cover assembly;

providing a headrest frame having a headrest stay portion formed therein;

inserting and placing the headrest frame in the trim cover assembly via the opening, while projecting the headrest stay portion from the trim cover assembly to outside, whereupon an incomplete headrest unit is assembled;

thereafter, inserting the injecting nozzle means via the opening into the trim cover assembly, such that the injecting nozzle means is inserted and secured slidably in the opening means associated with the foregoing one of pair of extensions;

then, placing the incomplete headrest unit together with the injection nozzle means in the foaming die means; and subjecting the incomplete headrest unit to a foaming by injecting the liquid base foaming material via the injecting nozzle means into the trim cover assembly and curing the same therewithin.

Accordingly, the provision of the foldable sealing means in one of the paired extensions allows the foldable sealing means per se to be disposed within the trim cover assembly and does not require any separate means for preventing the leakage of liquid base foaming material, which projects outwards, such as the tubular film required in the prior art. Also, during the foaming, the foldable sealing means is caused to be displaced along the injecting nozzle means and folded about the foregoing another of pair of extensions by a pressure applied thereto from the liquid base foaming material, so as to close and seal the opening of trim assembly against leakage of the liquid foaming material from the opening.

In one aspect of the present invention, the foldable sealing means may comprise a projected part extending from the above-said one of the paired extensions in a length greater than the another of paired extensions, with the opening means defined in that projected part. In an alternative aspect, such projected part may be formed by extending a whole of such one of paired extensions longer than the another of paired extensions.

Preferably, the hole means may comprise a hole formed in the foldable sealing means, which hole has an inner diameter slightly smaller than an outer diameter of the injection nozzle means, such that the hole will resiliently and closely contact a peripheral surface of injection nozzle means when the latter is inserted and secured in the former.

Other features and advantages of the present invention will become apparent from reading of the description hereinafter, with reference to the annexed drawings.

DETAILED DESCRIPTION OF PREFERRED EMBODIMENTS OF THE INVENTION

Referring to FIGS. 1 through 11, there are, by way of example, illustrated preferred modes of method for forming a headrest within the scope of the present invention.

The present invention hereby provides two non-distinctive modes of method to embody its inventive concept, simply by way of example, as will become understood hereinafter with reference to either one set of FIGS. 1 to 3 and 7, or another set of FIGS. 4 to 6 and 8, with the common foaming steps and resulting headrest shown in FIGS. 9 to 11.

Figure 3:
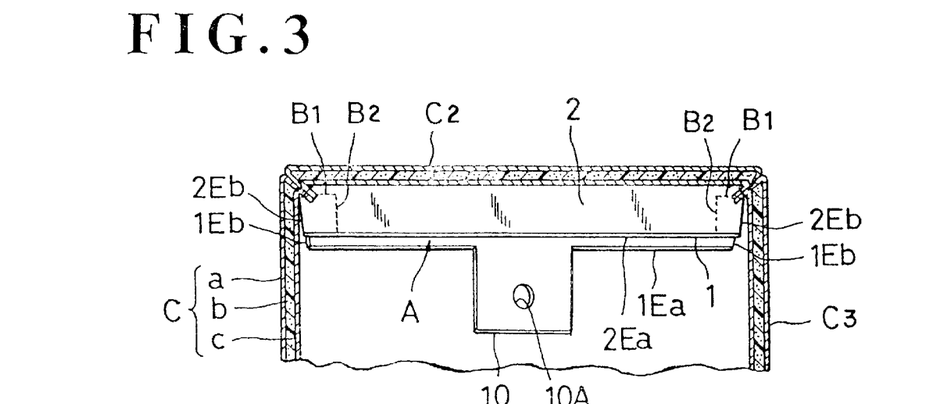
FIG. 3 is a fragmentary sectional view showing the state where the first mode of two extensions are disposed within the trim cover assembly.
Figure 6:
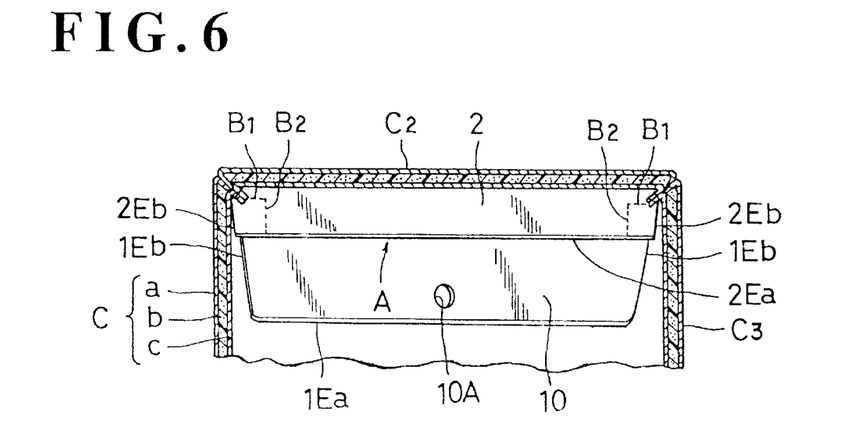
FIG. 6 is a fragmentary sectional view showing the state where the second mode of two extensions are disposed within the the trim cover assembly.

In both embodiments in FIGS. 1 through 11, there is shown in common a three-dimensional trim cover assembly (C) having a given outer configuration of headrest. The trim cover assembly (C) itself is preformed into the illustrated three-dimensional shape by sewing together required separate cover sections, as known in the art. As shown in FIGS. 3 and 6, however, in accordance with the present invention, the trim cover assembly (C) is of a three-layer lamination structure comprising a top cover layer (a), a foam wadding layer (b) (made of a slab urethane foam material), and a back cover layer (c), in this order, to give an elastic property thereto in addition to an improved texture and touch thereof, and further formed with a pair of first and second extensions (1)(2). Otherwise stated in this respect, the trim cover assembly (C) is generally composed of a bag-like body section (C3), a first half wall section (C1), a second half wall section (C2), and a slot-like elongated opening (A) defined between the first and second half wall sections (C1)(C2). Of course, those three sections (C3, C1, C2) are each of the three-layer lamination structure as can be seen in FIG. 3, and sewn with with one another, as in FIG. 1, to form a predetermined three-dimensional shape of headrest body. In particular, as viewed from FIGS. 1 and 4, the first and second half wall sections (C1)(C2) are sewn integrally to the upper side of the body section (C3), such that the respective free edges of two half wall sections (C1)(C2) face with each other to define the elongated opening (A) extending transversely of and in the width-wise direction of trim cover assembly (C). As will be explained, several constituent elements will be placed via the opening (A) into the trim cover assembly (A).

Figure 1:
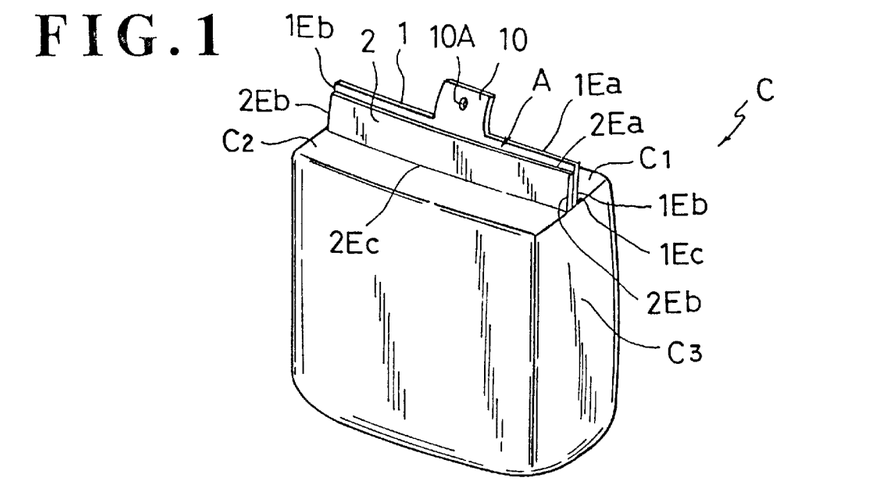
FIG. 1 is a schematic perspective view of a trim cover assembly having first mode of two extensions in accordance with the present invention.
Figure 4:
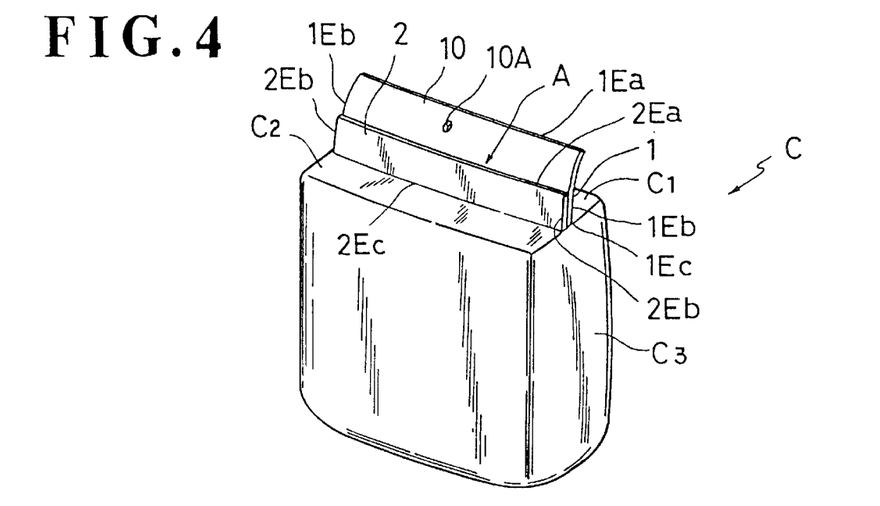
FIG. 4 is a schematic perspective view of a trim cover assembly having an alternative second mode of two extensions in accordance with the present invention.

In both two modes, as shown in FIGS. 1 and 4, initially, the first and second extensions (1)(2) extend from the elongated opening (A) upwardly and externally of the trim cover assembly (C). Those two extensions (1)(2) are each formed integrally and continuously from the respective free edges of first and second half wall sections (C1)(C2), having the above-noted three-layer lamination structure, and therefore elastically biased to contact with each other at their respective back cloth layers (c) due to an elastic linear recovery property of the foam wadding layer (b) in each extension, which efforts to resiliently recover its original linear orientation along the same or coplanar plane with the first and second half wall portions (C1)(C2). Thus, the elongated opening (A) is normally closed between the two extensions (1)(2) in an elastic manner.

Also, commonly in both two modes, the present invention provides an inventive means for solving the previously stated problems of prior art. Namely, the first extension (1) is provided with a foldable sealing means which is foldable about the free end portion (2Ea) of the second extension (2) to close and seal the elongated opening (A), and a hole means for allowing an injection nozzle portion (see the designation 3 in FIGS. 7 to 9) to be inserted therethrough during a foaming process to be described later.

Figure 2:
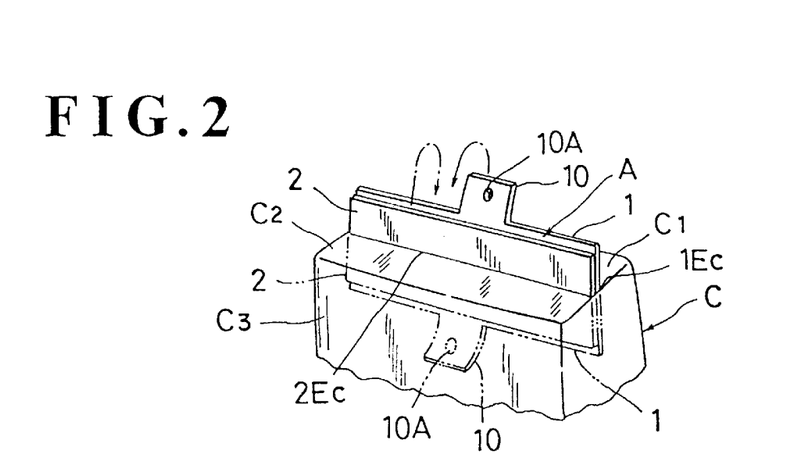
FIG. 2 is a partly broken perspective view showing how the first mode of two extensions are turned over into within the trim cover assembly.

Reference is now made to FIGS. 1 to 3, which embody the foregoing foldable sealing means as a free end portion (1Ea) and a projected part (10) in the first extension (1). As shown, both free end portion (1Ea) and projected part (10) extend integrally and continuously from the first extension (1) in a length greater than that of the second extension (2). The projected part (10) is formed as shown to project from the free end portion (1Ea). Of course, both free end portion (1Ea) and projected part (10) are of the same three-layer lamination structure with that of first extension (1), thus the linear elastic recovery property therein, Further, a through-hole (10A) is formed in that projected part (10), as the foregoing hole means for allowing an injection nozzle (30) to be inserted therethrough. These means will work as an inventive function during a foaming process to be set forth later.

Of course, the projected part (10) is of the same three-layer lamination structure with that of the trim cover assembly (C) as it is basically an integral part of the latter according to the illustrated embodiments.

Next, as indicated by the two-dot chain lines in FIG. 2, both first and second extensions (1)(2) are inserted into the elongated opening (A), such that they are turned downward towards each other, relative to their respective root juncture lines (1Ec)(2Ec), into the elongated opening (A), and completely turned over by 180 degrees to a state dependent from the opening (A) within the trim cover assembly (C), as best shown in FIG. 3. At this stage, the elongated opening (A) is elastically closed due to the elastic mutual contact between the first and second extensions (1)(2) at their respective top cover layer (a) along the juncture lines (1Ec, 2Ec) under the above-stated elastic recovery force of foam wadding layer (b). In this regard, the top cover layer (a) of both first and second extensions (1)(2) may preferably be formed from either of a gigged or raised material and a textile fabric which will help to make more frictional and tight the contact between the two extensions (1)(2) and thus close the elongated opening (A) more effectively.

Figure 7:
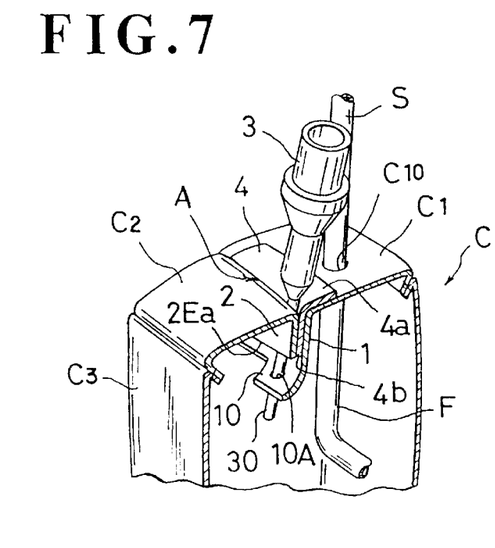
FIG. 7 is a partly broken perspective view showing the state where a headrest frame and an injection nozzle device are set in the first mode of trim cover assembly.

Thereafter, as shown in FIG. 7, a generally U-shaped headrest frame (F) is inserted through the elongated opening (A) into within the trim cover assembly (C), while passing the two headrest stay portions (S) thereof through the respective holes (C10) to the outside. , Designation (3) denotes an injection nozzle device equipped integrally with an inverted-L-shaped stretcher support plate (4). This injection nozzle device (3) is connected to a pump device (not shown), so that a liquid base foaming material (see the designation PM in FIG. 9) may be supplied to the device (3) by operation of the pump device and injected from the nozzle portion (30). The stretcher support plate (4) is intended to temporarily support and retain the injection nozzle device (3) in the elongated opening (A), generally upright, as shown in FIG. 7, so as to permit the device (3) per se to be easily and directly placed in a corresponding die surface area of foaming die (see FIG. 9). Also, the plate (4) is intended to stretch the elongated opening (A) in a direction intersecting the opening to increase the elastic repercussive force in the foam wadding layers (b) of both two extensions (1)(2), tending to close the opening (A) more tight, so that, when the the nozzle portion (30) of injection nozzle device (3) is inserted in the opening (A), any clearance will not be created around the nozzle portion (30) to insure preventing a possible leakage of a liquid base foaming material therefrom. For that purpose, the plate (4) may be of a length slightly smaller than the whole length of elongated opening (A), comprising a horizontal plate section (4a) for contact upon the outer surface of first half section (C1) of trim cover assembly (C), and a vertical plate section (4b) for insertion in the elongated opening (A).

As understandable from FIG. 7, this injection nozzle device (3) is set in the elongated opening (A) by passing its nozzle portion (30) through that opening and further passing the same through the hole (10A) formed in the projected part (10) associated with the first extension (1), while the stretcher support plate (4) is also set in the opening (A) by inserting its vertical plate section (4b) into and along the opening (A) and abutting its horizontal plate section (4a) on the outer surface of first half section (C1) of trim cover assembly (C). It is noted that the hole (10A) has a slightly smaller inner diameter than the outer diameter of the nozzle portion (30) with a view to causing the hole (10A) to resiliently and closely contact the circumferential surface of nozzle portion (30) such as to allow slidable displacement of the projected part (10) along the nozzle portion (30) via the hole (10A), while at the same time preventing leakage of a liquid foaming material therefrom during a subsequent foaming process to be described later.

In this context, it is preferred that, as viewed from FIG. 1, the projected part (10) be warped in a direction away from a vertical plane extending along the second extension (2), which is advantageous in not only allowing smooth entry of both first extension (1) and projected part (10) into the opening without interference with the second extension (2), but also allowing easy, precise insertion of the nozzle portion (30) into the hole (10A), after both first and second extensions (1)(2) have been set within the trim cover assembly (1) (because the hole (10A) lies opened generally at a horizontal plane right below the elongated opening (A) due to this warping of projected part (10) when the first extension (1) is turned over by 180 degrees into the trim cover assembly (C) as can be seen in FIG. 2.).

In this manner, an incomplete headrest unit is assembled as can be seen in FIG. 7.

Figure 9:
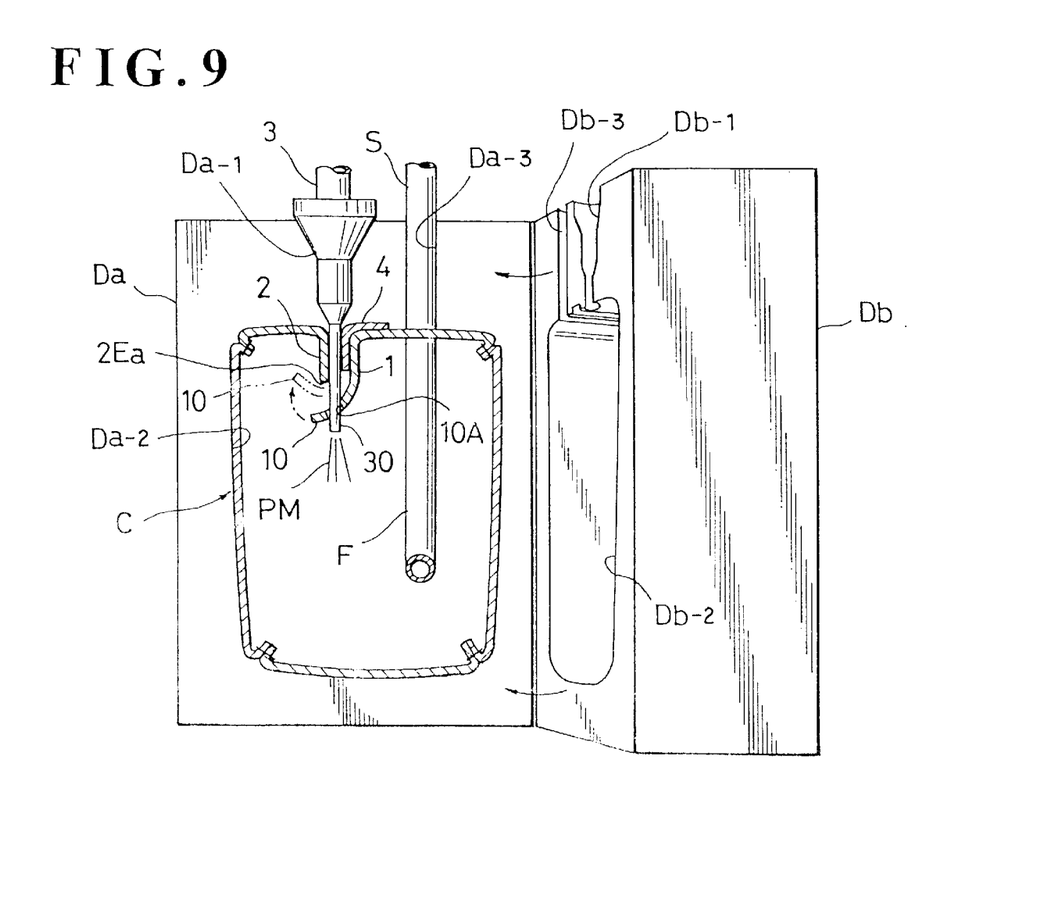
FIG. 9 is a partly broken perspective view showing the the state where an incomplete headrest unit is placed in a foaming die apparatus.

Referring now to FIG. 9, there is provided one exemplary mode of foaming die to be used in accordance with the present invention. As will be explained, the above-described incomplete headrest unit is placed in the foaming die for foaming purpose. The foaming die comprises a first half die member (Da) and second half die member (Db), each having their respective identical recessed die surface areas (Da-1, Da-2, Da-3)(Db-1, Db-2, Db-3) to be mated together to receive and secure the incomplete headrest unit therein. Hence, in both first and second half die members (Da)(Db), there is formed: an injection nozzle device die surface area (Da-1, Db-1) generally conforming to the upper portion of the injection nozzle device (3) excepting its nozzle portion (30); a trim cover assembly die surface area (Da-2, Db-2) generally conforming to the contour of the whole body of trim cover assembly (C); and a headrest stay portion die surface area (Da-3, Db-3) providing an elongated cavity in which both pair of headrest stay portions (S)(S) are to be partway secured. This foaming die is not limitative, and may be of another construction suited for accommodating the incomplete headrest unit therein.

Then, the incomplete headrest unit is introduced, with the injection nozzle device (3) projected upright as it is, into and placed in position within a first half die member (Da), such that the three-dimensional body of trim cover assembly is halfway secured in the corresponding die surface area (Da-2), while both injection nozzle device (3) and one of the two headrest stay portions (S) are directly placed and secured in the respective die surface areas (Da-1)(Da-3). Then, the second half die member (Db) is mated with the first half die member (Da) to have the remaining half portions of incomplete headrest unit secured in their respective corresponding die surface areas (Db-1, Db-2, Db-3). Though not shown, an intermediate die piece is inserted in the headrest stay portion die surface areas (Da-3)(Db-3) to close a cavity created between the two headrest stay portions (S) secured in those mated two die surface areas (Da-3, Db-3).

Thereafter, a liquid base foaming material (PM) is injected from the nozzle portion (30) into within the trim cover assembly (C) and cured therein. During this foaming process, it is appreciated that the increasing mass of foaming material being cured pushes the projected part (10) of first extension (1) upwards along the vertically extending nozzle portion (30), which in turn causes the associated free end portion (1Ea) to displace in the same upward direction, as indicated by the phantom direction in FIG. 9, with the result that both projected part (10) and end portion (1Ea) are brought to a close contact with the end portion (2Ea) of second extension (2) and folded thereabout, as indicated by the phantom lines. This effectively closes and seals the elongated opening (A) within the trim cover assembly (C) to insure preventing leakage of the liquid base foaming material (PM) from that opening (A).

At the completion of this foaming process, the resulting work of headrest is taken out from the die (Da,Db), and then both injection nozzle device (3) and support plate (4) are removed from the headrest through the hole (10A) and elongated opening (A). Now, a resulting headrest (HR) is obtained as shown in FIGS. 10 and 11, in which it is clearly observed that the projected part (10) as well as the adjacent end portion (1Ea) of first extension (1) are folded about the end portion (2Ea) of second extension (2) and embedded in the mass of cured foam material (P) to completely close and seal the opening (A) within the trim cover assembly (C).

Figure 5:
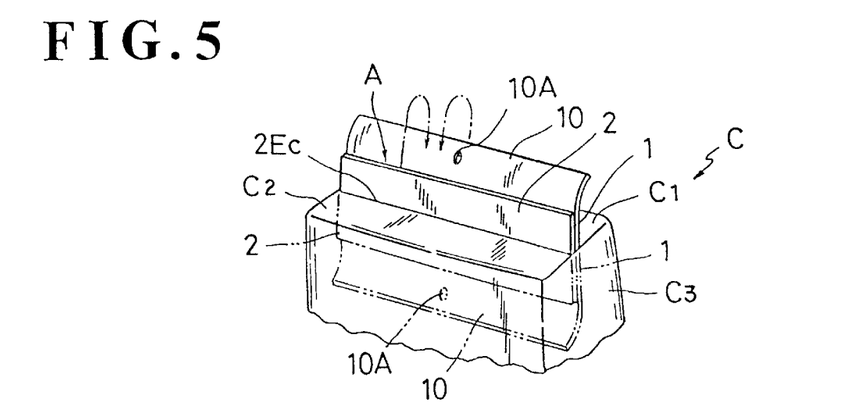
FIG. 5 is a partly broken perspective view showing how the second mode of two extensions are turned over into within the trim cover assembly.

On the other hand, FIGS. 4 to 6 show another alternative mode of projected part (10) as the foldable sealing means previously defined, which may be simply formed by extending the whole sheet of first extension (1) to the shown dimension greater in area than the second extension (2), such as to project therefrom in a length generally equal to that of the projected part (10) of the first mode. Also, as the previously defined hole means for allowing the injection nozzle (30) to be inserted therethrough, the present mode uses a hole (10A) same with that of the aforementioned first mode, which may be formed at a given point in the first extension (1). In the present embodiment, all other portions of trim cover assembly (C) than such increased size of first extension (1) are identical to those of the first mode described with reference to FIGS. 1 to 3. Therefore, all like designations to be given hereinafter correspond to all like designations used in the previously described first mode, and any repetition of description is deleted on the common portions and steps for the sake of simplicity. Of course, this particular first extension (1) is also of the same three-layer lamination structure with that of the trim cover assembly (C) as it is basically an integral part of the latter according to the illustrated embodiments.

Figure 8:
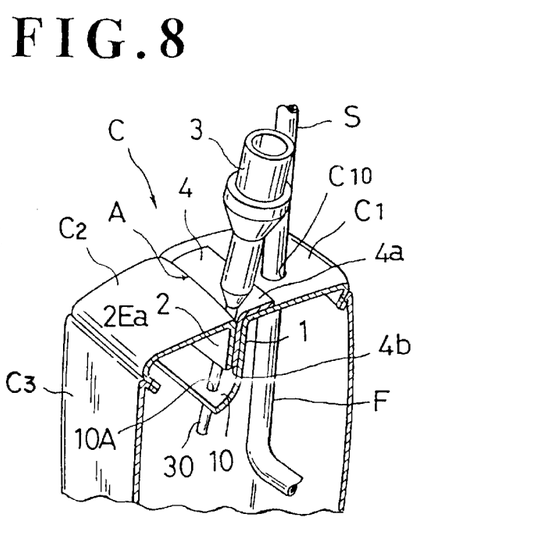
FIG. 8 is a partly broken perspective view showing the state where a headrest frame and an injection nozzle device are set in the second mode of trim cover assembly.

Turning back to FIGS. 4 to 6, it is apparent that all the initial steps for turning over and inserting both first and second extensions (1)(2) into the elongated opening (A) are effected just as likewise in those explained already in the first mode as in FIGS. 1 to 3, so that the two extensions (1)(2) are disposed in a state dependent from the two half wall sections (C1)(C2) within the trim cover assembly (C), as indicated in FIGS. 5 and 6. After having inserted a headrest frame (F) in the trim cover assembly (C) as in FIG. 7, the injection nozzle device (3) is set in the elongated opening (A) by passing its nozzle portion (30) therethrough and further inserting the same in the hole (10A) formed in the projected part (10), while the stretcher support plate (4) is also set in the opening (A) by inserting its vertical plate section (4b) into and along the opening (A) and abutting its horizontal plate section (4a) on the outer surface of first half section (C1) of trim cover assembly (C). Likewise in the first mode, the hole (10A) should have a slightly smaller inner diameter than the outer diameter of the nozzle portion (30) to attain the same effects discussed earlier. Also, as likewise in the first mode, the whole projected part (10), which extends from the second extension (2), should preferably be warped in a direction away from a vertical plane extending along the second extension (2), since this is indeed effective in not only allowing smooth entry of both projected part (10) and first extension (1) into the elongated opening (A) without interference with the second extension (2), but also allowing easy, precise insertion of the nozzle portion (30) into the hole (10A). Thus, an incomplete headrest unit is assembled as can be seen in FIG. 8. Then, this incomplete headrest unit is subjected to a foaming, using the same foaming die as indicated in FIG. 9. Namely, a liquid base foaming material (PM) is injected from the nozzle portion (30) into within the trim cover assembly (C) and cured therein. During this foaming process, it is appreciated that the increasing mass of foaming material being cured pushes the warped projected part (10) upwards along the vertically extending nozzle portion (30), as indicated by the phantom direction in FIG. 9, bringing the same to a close contact with the end portion (2Ea) of second extension (2) and folded thereabout, as indicated by the phantom lines, whereby the elongated opening (4) is closed and sealed within the trim cover assembly (C), to insure preventing leakage of the liquid base foaming material (PM) from that opening (A).

Figure 10:
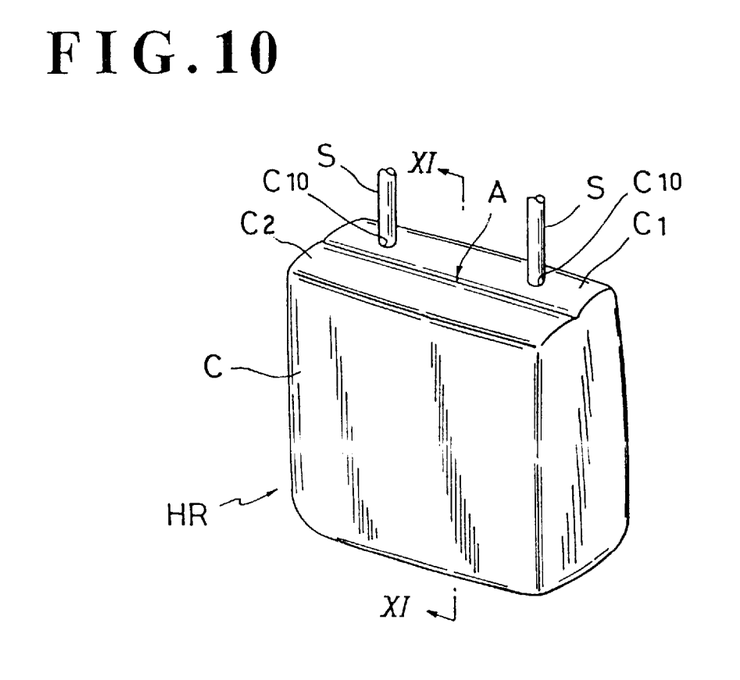
FIG. 10 is a schematic perspective view of a resulting headrest formed in accordance with the present invention.
Figure 11:
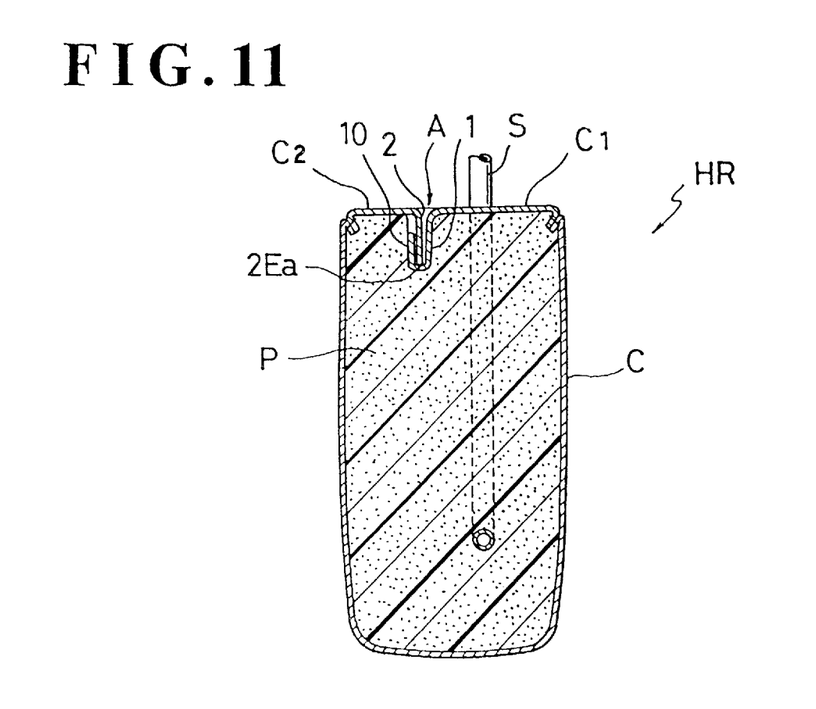
FIG. 11 is a sectional view taken along the line XI—XI FIG. 10.

At the completion of this foaming process, the resulting work of headrest is taken out from the die (Da,Db), and then both injection nozzle device (3) and support plate (4) are removed from the headrest through the hole (10A) and elongated opening (A), so that a resulting headrest (HR) is obtained as shown in FIGS. 10 and 11.

Accordingly, in accordance with the present invention, the injection nozzle portion (30) can be simply inserted into both elongated opening (30) and hole (10A) without use of any other separate fittings, such as the tubular film required in the prior art, and the liquid base foaming material is completely prevented against leakage from the elongated opening (A), even with the injection nozzle portion (30) inserted in the opening (A), during the foaming process. Thus, it is quite easy for a worker to operate the foaming process and produce a beautifully finished headrest without any objectionable or stained spot thereon.

It is noted in both of the two modes described above that, as seen from FIGS. 3 and 6, the lateral end portions (1Eb)(2Eb) respectively of the first and second extensions (1)(2) may be sewn together by threads (B1)(B2) in an inverted-L-shaped fashion in order to avoid creation of clearance at both lateral end regions (at 1Eb, 2Eb) of the two extensions (1)(2) and increase the elastic repercussive property of the two extensions (1)(2) to make more positive the elastic contact therebetween.

While having described the present invention thus far, it should be understood that the invention is not limited to the illustrated embodiments, but any other modifications, replacements and additions may be applied thereto structurally and methodologically without departing from the scopes of the appended claims. With regard to the two modes of projected part (10), it is obvious that the first mode of projected part (10) may be formed by directly cutting and trimming the second mode of projected part (10) (in FIG. 4) into the shape shown in FIG. 1.

What is claimed is:

1. A method for forming a headrest, comprising the steps of:

providing a three-dimensional trim cover assembly preformed in a predetermined headrest shape, which has an opening therein and a pair of extensions formed in said opening, wherein one of said pair of extensions includes a foldable sealing means defined therein, which is foldable about another of said pair of extensions to close and seal said opening, and a hole means defined in said one of said pair of extensions;

providing a foaming die means which includes an injection nozzle means for injecting a liquid foaming material into within said trim cover assembly;

providing a headrest frame having a headrest stay portion formed therein;

inserting and placing said headrest frame in said trim cover assembly via said opening, while projecting said headrest stay portion from said trim cover assembly to outside, whereupon an incomplete headrest unit is assembled;

thereafter, inserting said injection nozzle means via said opening into said trim cover assembly, such that said injection nozzle means is inserted and secured slidably in said hole means associated with said one of pair of extensions;

then, placing said incomplete headrest unit together with said injection nozzle means in said foaming die means; and subjecting said incomplete headrest unit to a foaming by injecting said liquid foaming material via said injection nozzle means into said trim cover assembly and curing the same therewithin;

whereby said foldable sealing means is caused to be displaced along said injection nozzle means and folded about said another of pair of extensions by a pressure applied thereto from said liquid foaming material during said foaming, so as to close and seal said opening of said trim assembly against leakage of said liquid foaming material from said opening.

2. The method as defined in claim 1, wherein said foldable sealing means comprises a projected part extending from said one of said pair of extensions in a length greater than said another of said pair of extensions, and wherein said opening means is defined in said projected part.

3. The method according to claim 1, wherein said foldable sealing means comprises a projected part extending integrally and continuously from said one of extensions in a length greater than said another of said pair of extensions, wherein said hole means is defined in said projected part, and wherein all said trim cover assembly, pair of extensions and projected part have a foam wadding layer of elastic nature contained therein.

4. The method according to claim 3, wherein all said trim cover assembly, pair of extensions and projected part are of a three-layer lamination structure comprising a top cover layer, said foam wadding layer and a back cloth layer, in this order.

5. The method according to claim 3, wherein said projected part is formed by extending whole of said one of said pair of extensions longer than said another one of said pair of extensions.

6. The method as defined in claim 1, wherein both said trim cover assembly and pair of extensions have a foam wadding layer of elastic nature contained therein, wherein said opening associated with said trim cover assembly is caused to be normally closed due to the elastic nature of said foam wadding layer, wherein said nozzle means is provided with a stretcher plate means, and wherein the method further includes the steps of inserting said stretcher plate means into said opening such as to stretch the opening to increase an elastic repercussive force of said foam wadding layer and close the opening tight, thereby avoiding creation of a clearance between said nozzle means and opening, at said step of inserting said injection nozzle means via said opening into said trim cover assembly.

7. The method as defined in claim 1, wherein said hole means comprises a hole formed in said foldable sealing means, said hole having an inner diameter slightly smaller than an outer diameter of said injection nozzle means, such that said hole will resiliently and closely contact a peripheral surface of said injection nozzle means when the latter is inserted and secured in the former, thereby allowing said foldable sealing means to be displaced along said injection nozzle via said hole in a sliding manner, while preventing leakage of said liquid base foaming material through said hole, during the foaming.

8. The method according to claim 6, wherein said stretcher plate means comprises a stretcher support plate provided integrally with said injection nozzle means, said stretcher support plate including one plate section for insertion into said opening and another plate section for contact upon said trim cover assembly, and wherein the method further includes the steps of inserting said one plate section of the stretcher support plate into said opening, while contacting said another plate section upon the trim cover assembly, at said step of inserting said injection nozzle means via said opening into said trim cover assembly, so as to not only stretch and close tight said opening, but also support said injection nozzle means on said trim cover assembly.

9. A method for forming a headrest, comprising the steps of:

providing a three-dimensional trim cover assembly preformed in a predetermined headrest shape, which has an opening formed in an elongated way in one side of said trim cover assembly and a pair of extensions, each being formed integrally from respective two edges of said opening, extending outwards from the trim cover assembly, wherein one of said pair of extensions includes a foldable sealing means defined therein, which is foldable about another of said pair of extensions to close and seal said opening, and a hole means defined in said one of said pair of extensions;

providing a foaming die means which includes an injection nozzle means for injecting a liquid foaming material into within said trim cover assembly;

providing a headrest frame having a headrest stay portion formed therein;

turning downwards and inserting said pair of extensions into said opening so that they are turned over relative to said opening in contact with each other and placed within said trim cover assembly in a state dependent from said one side of the trim cover assembly;

inserting and placing said headrest frame in said trim cover assembly via said opening, while projecting said headrest stay portion from said trim cover assembly to outside, whereupon an incomplete headrest unit is assembled;

thereafter, inserting said injection nozzle means via said opening into said trim cover assembly, such that said injection nozzle means is inserted and secured slidably in said hole means associated with said one of pair of extensions;

then, placing said incomplete headrest unit together with said injection nozzle means in said foaming die means; and subjecting said incomplete headrest unit to a foaming by injecting said liquid foaming material via said injection nozzle means into said trim cover assembly and curing the same therewithin;

whereby said foldable sealing means is caused to be displaced along said injection nozzle means and folded about said another of pair of extensions by a pressure applied thereto from said liquid foaming material during said foaming, so as to close and seal said opening of said trim assembly against leakage of said liquid foaming material from said opening.

10. The method as defined in claim 9, wherein said foldable sealing means comprises a projected part extending from said one of said pair of extensions in a length greater than said another of said pair of extensions, and wherein said hole means is defined in said projected part.

11. The method according to claim 9, wherein said foldable sealing means comprises a projected part extending integrally and continuously from said one of extensions in a length greater than said another of said pair of extensions, wherein said hole means is defined in said projected part, and wherein all said trim cover assembly, pair of extensions and projected part are of a three-layer lamination structure comprising a top cover layer, a foam wadding layer and a back cloth layer, in this order.

12. The method according to claim 11, wherein said projected part is formed by extending a whole of said one of the pair of extensions longer than said another one of the pair of extensions.

13. The method as defined in claim 9, wherein both said trim cover assembly and pair of extensions have a foam wadding layer of elastic nature contained therein, wherein said opening associated with said trim cover assembly is caused to be normally closed due to the elastic nature of said foam wadding layer, wherein said nozzle means is provided with a stretcher plate means, and wherein the method further includes the steps of inserting said stretcher plate means into said opening such as to stretch the opening in a direction intersecting the opening to increase an elastic repercussive force of said foam wadding layer and close the opening tight, thereby avoiding creation of a clearance between said nozzle means and opening, at said step of inserting said injection nozzle means via said opening into said trim cover assembly.

14. The method according to claim 13, wherein said stretcher plate means comprises a stretcher support plate provided integrally with said injection nozzle means, said stretcher support plate including one plate section for insertion into and along said opening in a longitudinal direction thereof, and another plate section for contact upon said trim cover assembly, and wherein the method further includes the steps of inserting said one plate section of the stretcher support plate in and along said opening, while contacting said another plate section upon the trim cover assembly, at said step of inserting said injection nozzle means via said opening into said trim cover assembly, so as to not only stretch and close tight said opening, but also support said injection nozzle means on said trim cover assembly.

15. The method as defined in claim 9, wherein said foldable sealing means comprises a projected part extending from said one of said pair of extensions in a length greater than said another of said pair of extensions, wherein said hole means is defined in said projected part, wherein said projected part is warped away from a vertical plane extending along said another of said pair of extensions, prior to said step of turning downwards and inserting said pair of extensions into said opening, whereby, when said pair of extensions are turned over relative to said opening in contact with each other and placed within said trim cover assembly, said projected part is brought to a state warped towards said another of said pair of extensions, with said hole means lying opened generally at a horizontal plane below said opening.

16. The method according to claim 15, wherein said projected part is formed by extending a whole of said one of the pair of extensions longer than said another one of the pair of extensions.

* * * * *